US012623613B2

(12) United States Patent　　　(10) Patent No.:　US 12,623,613 B2

Hsu et al.　　　(45) Date of Patent:　May 12, 2026

(54) SHOCK ABSORBING STRUCTURE OF MOBILE PHONE HOLDER

(71) Applicant: POWERGENE TECHNOLOGY CO., LTD., New Taipei City (TW)

(72) Inventors: Hui-Te Hsu, New Taipei City (TW); Chun-Hung Chen, New Taipei City (TW)

(73) Assignee: POWERGENE TECHNOLOGY CO., LTD., New Taipei City (TW)

( * ) Notice: Subject to any disclaimer, the term of this patent is extended or adjusted under 35 U.S.C. 154(b) by 354 days.

(21) Appl. No.: 18/444,760

(22) Filed: Feb. 18, 2024

(65) Prior Publication Data

US 2025/0263021 A1　　Aug. 21, 2025

(51) Int. Cl.
　B60R 11/02　　　(2006.01)
　*B60R 11/00*　　　(2006.01)
　*H04M 1/04*　　　(2006.01)
(52) U.S. Cl.
　CPC ... B60R 11/0241 (2013.01); *B60R 2011/0089* (2013.01); *H04M 1/04* (2013.01)

(58) Field of Classification Search
　CPC ........ B60R 11/0241; B60R 2011/0089; H04M 1/04
　See application file for complete search history.

(56) References Cited

U.S. PATENT DOCUMENTS

| | | | |
|---|---|---|---|
| 2019/0208042 A1* | 7/2019 | Yu | H04M 1/0202 |
| 2024/0067103 A1* | 2/2024 | Iverson | B60R 11/02 |
| 2024/0218955 A1* | 7/2024 | Deng | F16M 13/022 |

* cited by examiner

*Primary Examiner* — Dhaval V Patel
(74) *Attorney, Agent, or Firm* — HDLS IPR SERVICES; Chun-Ming Shih

(57)　　　ABSTRACT

A shock absorbing structure includes: a housing having an opening, an inner surface and an outer surface; a universal joint unit having a spherical joint, a bushing having a blocking plate and a convex piece, and a screw bolt; a shock absorbing ring sheathing a portion of the convex piece protruding from the housing and elastically abutting between the outer surface and the spherical joint; and a clamping claw disposed on the housing and covering the inner surface and the blocking plate. When the clamping claw is applied with an external force to move the housing toward the universal joint unit, the shock absorbing ring generates an elastic deformation to absorb an impact force.

10 Claims, 5 Drawing Sheets

SHOCK ABSORBING STRUCTURE OF MOBILE PHONE HOLDER

BACKGROUND OF THE DISCLOSURE

Technical Field

The present disclosure relates to a mobile phone holder, especially to a shock absorbing structure of a mobile phone holder.

Description of Related Art

With the electronic technology being rapidly developed, a mobile phone has become one of the necessary electronic devices for consumers. Peripheral produces relative to the mobile phone has also been available in the market, wherein a related-art mobile phone holder is commonly used on various occasions. The related-art mobile phone holder clamps a mobile phone by a clawing manner to make the mobile phone be fastened with a fastening seat. Some mobile phone holders are provided with a multi-staged linkage or a universal joint between the mobile phone holder and the fastening seat to adjust the angle and the location of the mobile phone holder, thus various operating environments required by consumers are satisfied.

However, no matter the mobile phone holder is the fixed type or has the multi-staged linkage or the universal joint, a shock absorbing structure is not provided to the mobile phone holder. When the mobile phone holder or the mobile phone is subjected to an impact, a collision or a shock, the impact force is directly transferred to the fastening seat of the mobile phone holder and the mobile phone holder may be damaged after being used for a period of time, the aforesaid problem mostly happens when the mobile phone holder is installed on a motorcycle or a car.

Accordingly, the applicant of the present disclosure has devoted himself for improving the mentioned shortages.

SUMMARY OF THE DISCLOSURE

The present disclosure is to provide a shock absorbing structure of a mobile phone holder, which has an advantage of preventing an impact force from being directly transferred to a universal joint unit, and protecting the mobile phone holder from being damaged.

Accordingly, the present disclosure provides a shock absorbing structure of a mobile phone holder, which includes a housing, a universal joint unit, a shock absorbing ring and a clamping claw. The housing has an opening, an inner surface and an outer surface, wherein the opening is in communication with the inner surface and the outer surface. The universal joint unit includes a spherical joint, a bushing and a screw bolt. The bushing includes a blocking plate and a convex piece. The convex piece passes through the opening. The blocking plate abuts against the inner surface. The screw bolt passes through the convex piece and is screwed and fastened with the spherical joint. The shock absorbing ring sheathes at a portion of the convex piece which protrudes from the housing, and elastically abuts between the outer surface and the spherical joint. The clamping claw is disposed on the housing and covers the inner surface and the blocking plate. When the clamping claw is applied with an external force to move the housing toward the universal joint unit, the shock absorbing ring generates an elastic deformation to absorb an impact force.

According to one embodiment of the present disclosure, the shock absorbing ring is substantially formed in a ball shape, the shock absorbing ring has a truncated opening, and the truncated opening abuts against the spherical joint.

According to one embodiment of the present disclosure, the spherical joint includes a connecting seat and a ball part, the connecting seat has a screw hole allowing the screw bolt to be screwed in and fastened, and the ball part is disposed at one side of the connecting seat away from the screw hole.

According to one embodiment of the present disclosure, the connecting seat has a step, the step surrounds the screw hole, and the shock absorbing ring elastically abuts against the step.

According to one embodiment of the present disclosure, the spherical joint has a position limiting recess, and one end of the convex piece away from the blocking plate is disposed in the position limiting recess.

According to one embodiment of the present disclosure, a shape of the convex piece is corresponding to a shape of the opening.

According to one embodiment of the present disclosure, the convex piece is a non-circular piece, and the opening is a non-circular slot.

According to one embodiment of the present disclosure, the universal joint unit has a pad, and the pad sheathes the convex piece and clamped between the inner surface and the blocking plate.

According to one embodiment of the present disclosure, the clamping claw includes a cover case, a fixed claw and a moveable claw, the cover case correspondingly covers the housing, the fixed claw is fastened at one end of the cover case and the moveable claw is moveably disposed at another end of the cover case.

According to one embodiment of the present disclosure, the moveable claw moves a distance in a direction away from the fixed claw.

Advantages achieved by the present disclosure are as follows. According to the shock absorbing structure of the mobile phone holder provided by the present disclosure, the impact force is prevented from being directly transferred to the universal joint unit and the mobile phone holder is protected from being damaged by sheathing the shock absorbing ring at a portion of the convex piece protruding from the housing and elastically abutting between the housing and the spherical joint.

BRIEF DESCRIPTION OF THE DRAWINGS

The disclosure itself, however, may be best understood by reference to the following detailed description of the disclosure, which describes a number of exemplary embodiments of the disclosure, taken in conjunction with the accompanying drawings, in which.

DETAILED DESCRIPTION

Figure 1:
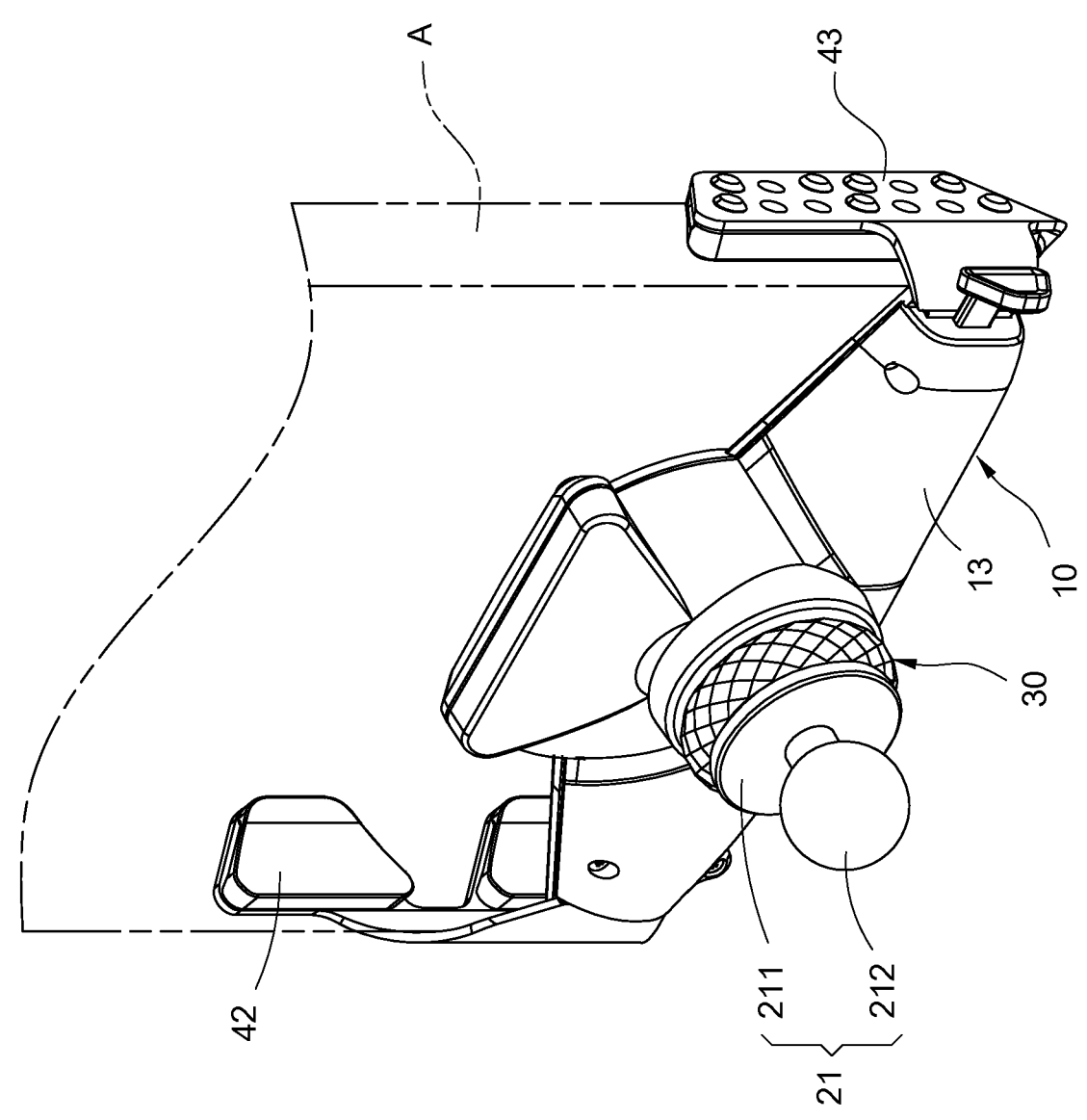
FIG. 1 is a perspective view showing the assembly according to the present disclosure.

It is to be understood that the terms for indicating positions and the location relation, for example "front", "rear", "left", "right", "front end", "rear end", "distal end", "vertical", "horizontal", "top end" and "bottom end", are based on the positions and the location relation disclosed in the drawings, and only used for disclosing the present disclosure and not used for indicating or implying the specified location of the device or the components or the specified structure and operation in certain location, thus the present disclosure is not intended to be limiting.

The technical contents of this disclosure will become apparent with the detailed description of embodiments accompanied with the illustration of related drawings as follows. It is intended that the embodiments and drawings disclosed herein are to be considered illustrative rather than restrictive.

The present disclosure provides a shock absorbing structure of a mobile phone holder, which is moveably and pivotally disposed in a mobile phone holder fastening seat B and capable of clamping and fastening a mobile phone A. Please refer from FIG. 1 to FIG. 4, the shock absorbing structure of the mobile phone holder of the present disclosure includes a housing 10, a universal joint unit 20, a shock absorbing ring 30 and a clamping claw 40.

Figure 2:
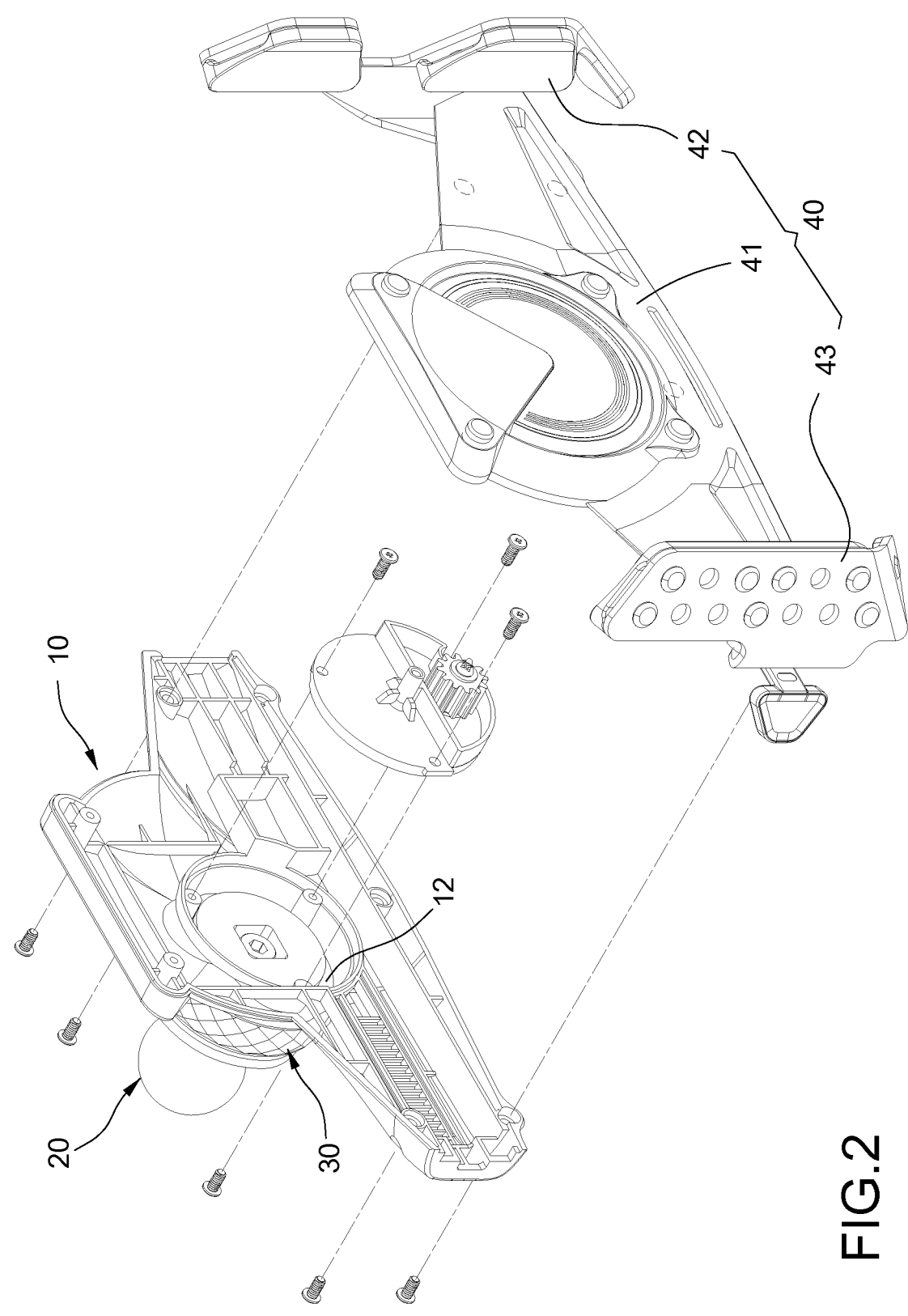
FIG. 2 is a perspective exploded view according to the present disclosure.
Figure 3:
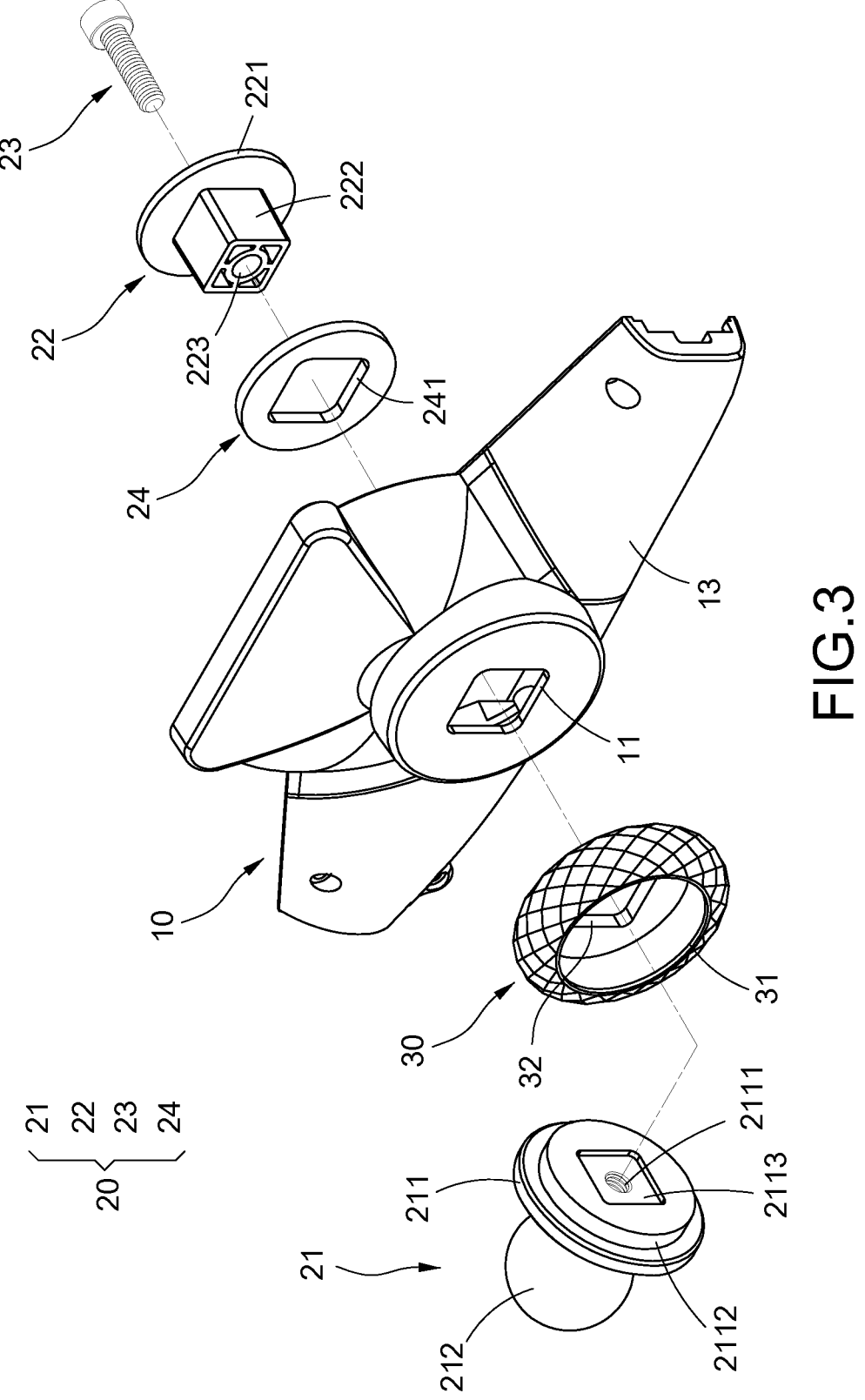
FIG. 3 is a partial perspective exploded view according to the present disclosure.
Figure 4:
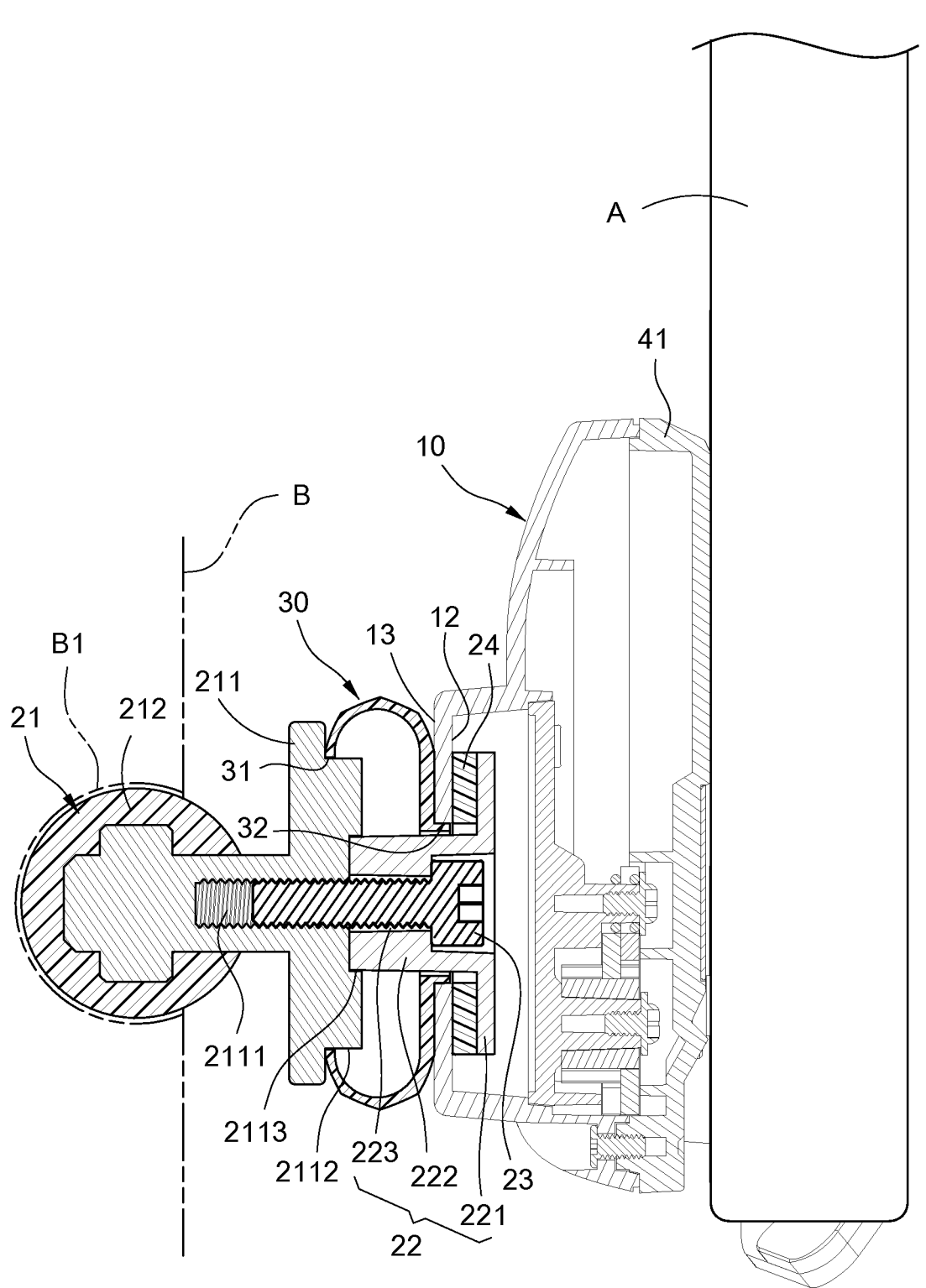
FIG. 4 is a side cross-sectional view according to the present disclosure.

In some embodiments, the housing 10 is formed as one piece (or integrally formed) by a plastic injecting molding, here is not intended to be limiting. In some embodiments, the housing 10 is substantially formed in a triangular shape. In other embodiments, the shape of the housing 10 may be formed in any geometrical shape according to different needs, here is not intended to be limiting. The housing 10 has an opening 11, an inner surface 12 and an outer surface 13. In some embodiments, the outer surface 13 is defined as an outer side surface of the housing 10 as shown in FIG. 1 or FIG. 3. The inner surface 12 is defined as an inner side surface of the housing 10 as shown in FIG. 2 or FIG. 4. The opening 11 is in communication with the inner surface 12 of the housing 10 and the outer surface 13 of the housing 10.

The universal joint unit 20 mainly includes a spherical joint 21, a bushing 22 and a screw bolt 23. The bushing 22 includes a blocking plate 221 and a convex piece 222 connected to each other. In some embodiments, the blocking plate 221 is connected to one end of the convex piece 222, and the bushing 22 has a sunk hole 223 penetrating the blocking plate 221 and the convex piece 222. The bushing 22 passes through the housing 10. In some embodiments, the convex piece 222 passes through the opening 11 from the inner surface 12 of the housing 10 and protrudes from the outer surface 13 of the housing 10, thus the blocking plate 221 abuts against the inner surface 12 correspondingly. The screw bolt 23 passes through the convex piece 222 and is screwed and fastened with the spherical joint 21. In some embodiments, the screw bolt 23 passes through the sunk hole 223 of the bushing 22 and is screwed and fastened with the spherical joint 21, thus the screw bolt 23 presses the bushing 22 toward the inner surface 12 of the housing 10.

In some embodiments, the shock absorbing ring 30 is made of silicone or rubber, here is not intended to be limiting. The shock absorbing ring 30 may be made of any other buffering material. The shock absorbing ring 30 is an elastic hollow spherical member formed in an annular status and having two openings opposite to each other. The shock absorbing ring 30 sheathes a portion of the convex piece 222 which protrudes from the housing 10, and elastically abuts between the outer surface 13 and the spherical joint 21. In some embodiments, the shock absorbing ring 30 has a truncated opening 31 and a convex ring part 32 disposed at two sides and communicating with each other. The truncated opening 31 abuts against the spherical joint 21. The convex ring part 32 sheathes the convex piece 222 and is latched in the opening 11 of the housing 10 to be positioned, thus one side of the shock absorbing ring 30 facing the housing 10 abuts against the outer surface 13 of the housing 10.

The clamping claw 40 is disposed on the housing 10 and covers the inner surface 12 and the blocking plate 221. The clamping claw 40 includes a cover case 41, a fixed claw 41 and a moveable claw 43. The shape of the cover case 41 is corresponding to the shape of the housing 10 to cover on the housing 10. The cover case 41 and the housing 10 are fastened by, for example, latching, buckling, adhering, welding or locking, etc., here is not intended to be limiting. The fixed flaw 42 is fastened at one end of the cover case 41, and the moveable claw 43 is moveably disposed at another end of the cover case 41. The arranging direction in which the fixed claw 42 being arranged at the left side of the cover case 41 and the moveable claw 43 being arranged at the right side of the cover case 41 shown in FIG. 1 is served as an example according to one of the exemplary embodiments. The moveable claw 43 moves a distance in a direction away from the fixed claw 42, thus a user may easily place and clamp the mobile phone A.

Figure 5:
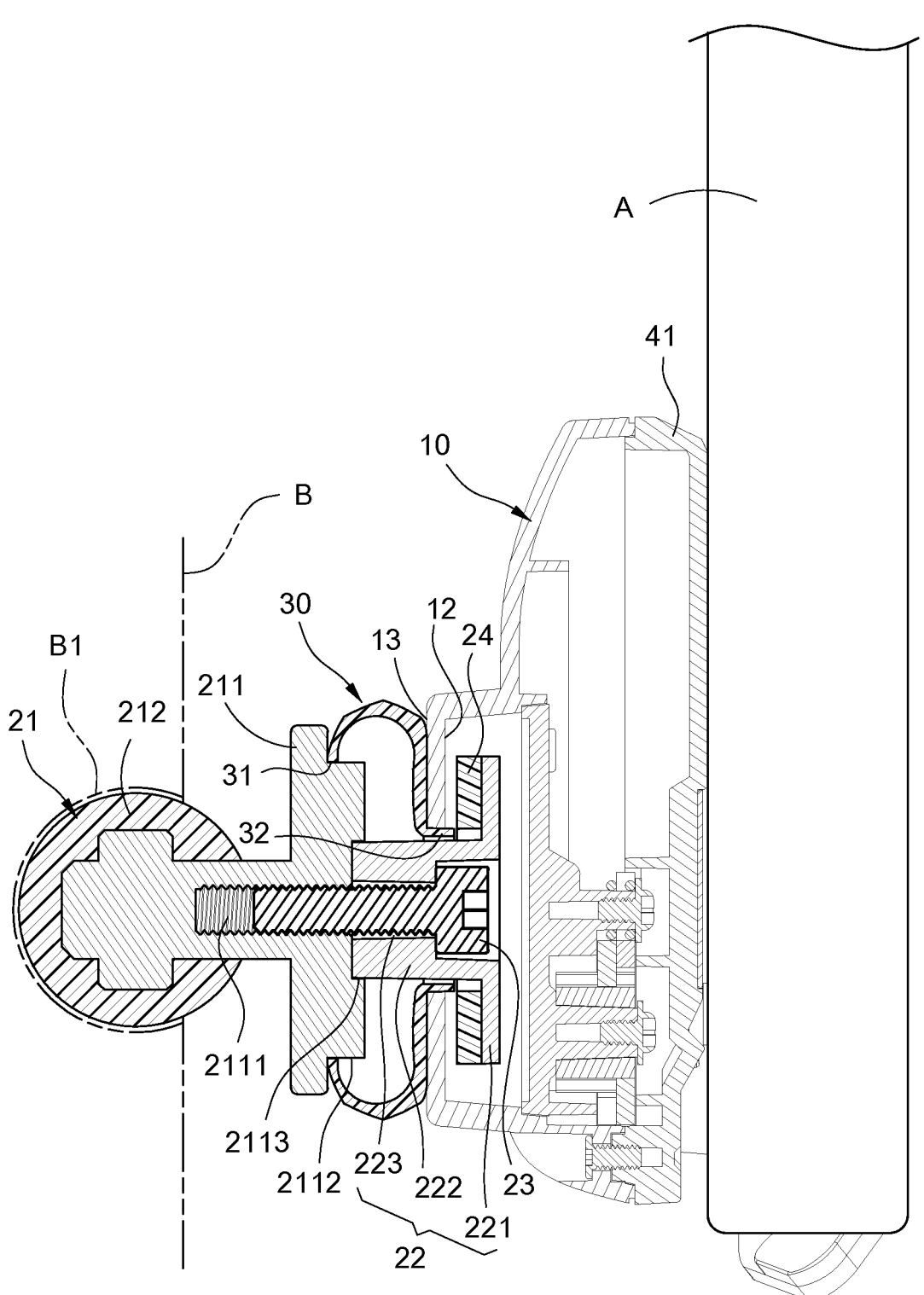
FIG. 5 is a side cross-sectional view showing an operating status according to the present disclosure.

Please refer to FIG. 4 and FIG. 5, the cover case 41 of the clamping claw 40 is fastened on the housing 10, when the clamping claw 40 is applied with an external force to move or rotate the housing 10 toward the universal joint unit 20, the shock absorbing ring 30 elastically clamped between the housing 10 and the spherical joint 21 generates an elastic deformation to absorb an impact force as shown in FIG. 5, thus the impact force is prevented from being directly transferred to the spherical joint 21, and the mobile phone holder is protected from being damaged.

Details are provided as follows. Please refer to FIG. 3 and FIG. 4, the spherical joint 21 further includes a connecting seat 21 and a ball part 212. The shape of the connecting seat 211 is substantially formed as the queen in the chess, here is not intended to be limiting. The connecting seat 211 has a screw hole 2111 arranged toward a side surface of the shock absorbing ring 30 for the screw bolt 23 to be screwed in. The ball part 212 is fastened and disposed at a protruding portion at one side of the connecting seat 221 away from the screw hole 2111, thus the ball part 212 is rotatably disposed in an accommodation slot B1 of the mobile phone holder fastening seat B.

The connecting seat 211 further has a step 2112 arranged toward a side surface of the shock absorbing ring 30. The step 2112 surrounds the screw hole 2111 and is arranged close to an outer edge of the connecting seat 211. The truncated opening 31 of the shock absorbing ring 30 sheathes the step 2112 and elastically abuts against the connecting seat 211.

The connecting seat 211 of the spherical joint 21 further has a position limiting recess 2113. In some embodiments, the position limiting recess 2113 is disposed on a side surface of the connecting seat 211 which faces the shock absorbing ring 30. The step 2112 surrounds a periphery of the position limiting recess 2113, but the step 2112 is not connected to the position limiting recess 2113. One end of the convex piece 222 away from the blocking plate 221 is latched in the position limiting recess 2113, thus the bushing 22 and the connecting seat 211 of the spherical joint 21 are mutually positioned.

Details are provided as follows. The universal joint unit 20 further includes a pad 24. The pad 24 has a through hole 241. The through hole 241 of the pad 24 sheathes the convex piece 222 and the pad 24 is clamped between the inner surface 12 of the housing 10 and the blocking plate 221 of the bushing 22, thus a stress applied by the bushing 22 to the housing 10 is reduced when the screw bolt 23 locks and fastens the spherical joint 21. The pad 24 is made of a plastic material or a metal material, here is not intended to be limiting.

Details are provided as follows. The shape of the convex piece 222 is corresponding to the shape of the opening 11, the shape of the through hole 241, the shape of the convex ring part 32 and the shape of the position limiting recess 2113. More detailly, the shape of the opening 11, the shape of the through hole 241, the shape of the convex ring part 32 and the shape of the position limiting recess 2113 are determined with respect to the shape of the convex piece 222. According to the present disclosure, the convex piece 222 is a non-circular piece, the opening 11 is a non-circular slot, the through hole 241 is a non-circular hole, the convex ring part 32 is a non-circular ring, the position limiting recess 2113 is a non-circular recess, thus the bushing 22 is prevented from rotating relative to the housing 10, the pad 24, the shock absorbing ring 30 or the spherical joint 21. In some embodiments, the convex piece 222 is substantially formed as a rectangular piece, here is not intended to be limiting. For example, the convex piece 222 may be a triangular piece, a pentagonal piece or any other geometrical piece.

According to the shock absorbing structure of the mobile phone holder, the cover case 41 of the clamping claw 40 is fastened on the housing 10, and the shock absorbing ring 30 elastically abuts between the housing 10 and the spherical joint 20, when the clamping claw 40 is applied with the external force to move or rotate the housing 10 toward the universal joint unit 20, the shock absorbing ring 30 generates the elastic deformation to absorb the impact force, thus the impact force is prevented from being directly transferred to the spherical joint 21, and the mobile phone holder is protected from being damaged.

While this disclosure has been described by means of specific embodiments, numerous modifications and variations could be made thereto by those skilled in the art without departing from the scope and spirit of this disclosure set forth in the claims.

What is claimed is:

1. A shock absorbing structure of a mobile phone holder, the shock absorbing structure comprising:
    a housing, comprising an opening, an inner surface and an outer surface, wherein the opening communicates with the inner surface and the outer surface;
    a universal joint unit, comprising a spherical joint, a bushing and a screw bolt, wherein the bushing comprises a blocking plate and a convex piece, the convex piece passes through the opening, the blocking plate abuts against the inner surface, and the screw bolt passes through the convex piece and is fastened with the spherical joint;
    a shock absorbing ring, adapted to sheathe a portion of the convex piece protruding from the housing and elastically abutting between the outer surface and the spherical joint; and
    a clamping claw, disposed on the housing and covering the inner surface and the blocking plate;
    wherein, when the clamping claw is applied with an external force to move the housing toward the universal joint unit, the shock absorbing ring generates an elastic deformation to absorb an impact force.

2. The shock absorbing structure according to claim 1, wherein the shock absorbing ring is formed in a hollow ball shape, the shock absorbing ring comprises a truncated opening, and a periphery of the truncated opening abuts against the spherical joint.

3. The shock absorbing structure according to claim 1, wherein the spherical joint comprises a connecting seat and a ball part, the connecting seat comprises a screw hole for the screw bolt to be fastened, and the ball part is disposed at one side of the connecting seat away from the screw hole.

4. The shock absorbing structure according to claim 3, wherein the connecting seat comprises a step, the step surrounds the screw hole, and the shock absorbing ring elastically abuts against the step.

5. The shock absorbing structure according to claim 1, wherein the spherical joint comprises a position limiting recess, and one end of the convex piece away from the blocking plate is disposed in the position limiting recess.

6. The shock absorbing structure according to claim 1, wherein a shape of the convex piece is corresponding to a shape of the opening.

7. The shock absorbing structure according to claim 6, wherein the convex piece is a non-circular piece, and the opening is a non-circular slot.

8. The shock absorbing structure according to claim 1, wherein the universal joint unit comprises a pad, and the pad is adapted to sheathe the convex piece and clamped between the inner surface and the blocking plate.

9. The shock absorbing structure according to claim 1, wherein the clamping claw comprises a cover case, a fixed claw and a moveable claw, wherein the cover case correspondingly covers the housing, the fixed claw is fastened at one end of the cover case and the moveable claw is moveably disposed at another end of the cover case.

10. The shock absorbing structure according to claim 9, wherein the moveable claw moves a distance in a direction away from the fixed claw.

\* \* \* \* \*